(12) United States Patent
Maes et al.

(10) Patent No.: US 12,137,506 B2
(45) Date of Patent: Nov. 5, 2024

(54) CONTROLLER FOR TRAINING A MACHINE FOR AUTOMATIZING LIGHTING CONTROL ACTIONS AND A METHOD THEREOF

(71) Applicant: SIGNIFY HOLDING B.V., Eindhoven (NL)

(72) Inventors: Jérôme Eduard Maes, Eindhoven (NL); Muhammad Mohsin Siraj, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 30 days.

(21) Appl. No.: 18/029,201

(22) PCT Filed: Sep. 20, 2021

(86) PCT No.: PCT/EP2021/075749
§ 371 (c)(1),
(2) Date: Mar. 29, 2023

(87) PCT Pub. No.: WO2022/069269
PCT Pub. Date: Apr. 7, 2022

(65) Prior Publication Data
US 2023/0363069 A1 Nov. 9, 2023

(30) Foreign Application Priority Data
Oct. 2, 2020 (EP) ..................................... 20199827

(51) Int. Cl.
*H05B 47/155* (2020.01)
*G06N 20/00* (2019.01)
*H05B 47/105* (2020.01)

(52) U.S. Cl.
CPC ........... *H05B 47/155* (2020.01); *G06N 20/00* (2019.01); *H05B 47/105* (2020.01)

(58) Field of Classification Search
None
See application file for complete search history.

(56) References Cited

U.S. PATENT DOCUMENTS

2010/0164398 A1* 7/2010 Verburgh ............. H05B 47/155
315/292
2017/0285594 A1 10/2017 Stewart et al.
(Continued)

OTHER PUBLICATIONS

Karami, Abir B., "User in the Loop: Adaptive Smart Homes Exploiting User Feedback—State of the Art and Future Directions," Information, www.mdpi.com/journal/information, 2016 (18 Pages).

*Primary Examiner* — Wilson Lee

(57) ABSTRACT

A method for training a machine for automatizing lighting control actions, wherein the method comprises the steps of: controlling one or more lighting devices to render a first light effect based on a first set of control parameters; controlling the one or more lighting devices to render a second light effect based on a second set of control parameters by transitioning over a transitioning time period from the first light effect to the second light effect; receiving a feedback from a user during a feedback time period; wherein if the feedback has been received within a predetermined time period during the feedback time period; associating the feedback with the transition; and wherein if the feedback has been received after the predetermined time period during the feedback time period; associating the feedback with the second light effect; and wherein the method further comprises training the machine based on the associated feedback.

15 Claims, 6 Drawing Sheets

(56) References Cited

U.S. PATENT DOCUMENTS

| | | |
|---|---|---|
| 2018/0253222 A1 | 9/2018 | Zhao et al. |
| 2019/0166670 A1 | 5/2019 | Alfier et al. |
| 2019/0289698 A1 | 9/2019 | Rozendaal et al. |
| 2020/0229286 A1* | 7/2020 | Summers .............. G06V 40/107 |
| 2022/0067544 A1* | 3/2022 | Hu ........................... G06N 3/08 |
| 2022/0159811 A1* | 5/2022 | Campanella ......... H05B 47/115 |

* cited by examiner

CONTROLLER FOR TRAINING A MACHINE FOR AUTOMATIZING LIGHTING CONTROL ACTIONS AND A METHOD THEREOF

CROSS-REFERENCE TO PRIOR APPLICATIONS

This application is the U.S. National Phase application under 35 U.S.C. §371 of International Application No. PCT/EP2021/075749, filed on Sep. 20, 2021, which claims the benefit of European Patent Application No. 20199827.5, filed on Oct. 2, 2020. These applications are hereby incorporated by reference herein.

FIELD OF THE INVENTION

The invention relates to a method for training a machine for automatizing lighting control actions. The invention further relates to a controller, a system and a computer program product for training a machine for automatizing lighting control actions.

BACKGROUND

Connected lighting refers to a system of one or more lighting devices which are controlled not by (or not only by) a traditional wired, electrical on-off or dimmer circuit, but rather by using a data communications protocol via a wired or more often wireless connection, e.g. a wired or wireless network. These connected lighting networks form what is commonly known as Internet of Things (IoT) or more specifically Internet of Lighting (IoL). Typically, the lighting devices, or even individual lamps within a lighting device, may each be equipped with a wireless receiver or transceiver for receiving lighting control commands from a lighting control device according to a wireless networking protocol such as Zigbee, Wi-Fi or Bluetooth.

These lighting devices in the connected lighting system can be controlled to render different light effects, e.g. based on user preferences. Advances in machine learning have enabled learning which light effects are preferred by a user. A user can provide feedback about his preference to different light effects and a self-learning system using machine learning can learn the preferences of the user related to the different light effects. A trained model can then be used to automatically control lighting devices to render the user's preferred light effects.

US 2017/285594A1 discloses a device which includes a processor, a communication interface accessible to the processor, and storage accessible to the processor. The storage bears instructions executable by the processor to identify an activity associated with a user. The instructions are also executable by the processor to use the communication interface to transmit at least one command to a light output apparatus to adjust light from the light output apparatus based on the identified activity.

SUMMARY OF THE INVENTION

The inventors have realized that the lighting system may transition from one light setting to a different light setting and a user can provide feedback related to the change. It may, however, be possible that the user is displeased with the transition from the first light setting to a second light setting instead of with the second light setting itself. The learning system may interpret such displeasure as a negative feedback on the second light setting, whereas the user may actually like the second light setting but is displeased with the way the transition has occurred.

It is therefore an object of the present invention to determine if the feedback provided by a user is directed to a lighting transition from a first to a second light setting, or if the feedback is directed to the second light setting, and thereby improve the learning system.

According to a first aspect, the object is achieved by a method for training a machine for automatizing lighting control actions, wherein the method comprises the steps of: controlling one or more lighting devices to render a first light effect based on a first set of control parameters; controlling the one or more lighting devices to render a second light effect based on a second set of control parameters by transitioning over a transitioning time period from the first light effect to the second light effect; receiving a feedback from a user during a feedback time period; wherein if the feedback has been received within a predetermined time period during the feedback time period; associating the feedback with the transition; and wherein if the feedback has been received after the predetermined time period during the feedback time period; associating the feedback with the second light effect; and wherein the method further comprises training the machine based on the associated feedback.

The method may comprise controlling one or more lighting devices to render a first and a second light effect based on a first and a second set of control parameters, respectively. For example, the light effect may comprise color, color temperature, intensity, beam width, beam direction, illumination intensity, and/or other parameters of light sources of the one or more lighting devices. The control parameters, such as input current, voltage, orientation of the one or more lighting devices, etc. may be related to controlling the light effects. The one or more lighting devices are arranged to illuminate an environment. A user who is present in the environment and has also seen a change from the first light effect to the second light effect after a transition can provide his/her feedback during a feedback time period. The method further comprises, if the feedback has been received within a predetermined time period, the feedback may be associated with the transition, and, if the feedback has been received after the predetermined time period, the feedback may be associated with the second light effect. The method thereby provides a time-based approach to determining whether the feedback provided by a user is directed to a lighting transition from a first to a second light setting, or the feedback is directed to the second light setting. The association may be based on a time instance at which the feedback has been received with respect to the transitioning time period. A machine or a model may be trained using such assigned feedback, thereby improving training of the machine learning system. In an example, the machine training may comprise determination of the second set of control parameters and/or of the transition.

According to a second aspect, the object is achieved by a method for training a machine for automatizing lighting control actions, wherein the method comprises the steps of: controlling one or more lighting devices to render a first light effect based on a first set of control parameters; controlling the one or more lighting devices to render a second light effect based on a second set of control parameters by transitioning over a transitioning time period from the first light effect to the second light effect; receiving a feedback from a user during a feedback time period; assigning a likelihood to an association of the feedback with the transition and with the second light effect; wherein the likelihood that the feedback is associated with the transition decreases as a function of time during the feedback time period; and wherein the likelihood that the feedback is associated with the second light effect increases accordingly; and training the machine based on the likelihood of the associated feedback.

In some cases, the feedback may be related to both the transition and the second light effect. In such cases (but not limited to these cases), the method may comprise assigning a likelihood to an association of the feedback with the transition and with the second light effect. The likelihood may comprise probabilities or weights of feedback being assigned to transition/second light effect. The likelihood may comprise relative weights or relative probabilities. The likelihood may be based on a function of time such that the likelihood that the feedback is associated with the transition decreases as a function of time during the feedback time period; and wherein the likelihood that the feedback is associated with the second light effect increases accordingly. The machine may be trained using the likelihood (probabilities or weights) on transition and the second effect respectively, thereby improving training of the machine learning system. In an example, a single machine/model may be trained. Additionally, and/or alternatively, separate models/machines may be trained for transition and the second light effect.

In an embodiment, the feedback time period may partially overlap with the transitioning time period, and wherein the method may further comprise if the feedback has been received within the overlapping time period; associating the feedback with the transition.

The feedback time period comprises the time within which the user can provide feedback. In other words, only during the feedback time period a user's feedback may be accepted. In this example, the feedback time period may partially overlap with the transitioning time period. The feedback time period may start during the transitioning time period and end after the end of the transitioning time period. For example, the user's feedback may be accepted during the transitioning time period. If the feedback has been received during the overlapping time period, i.e. during the transitioning time period, it indicates that the user likes/dislikes the transition as the user has not yet seen the second light effect and has already provided his/her feedback. Therefore, such a feedback is advantageously associated with the transition. If the feedback has been received after the overlapping time period, e.g. after the transitioning time period, it may indicate that the user likes/dislikes the second light effect as the user has seen the second light effect. Therefore, such a feedback may be advantageously associated with the second light effect.

In an embodiment, the feedback time period may start after the transitioning time period. Alternative to overlapping time period, the feedback time period may not be overlapping and may start after the transition has been taken place and the user's feedback is only acceptable after the transition has been taken place. The moment the user provides the feedback after the transition may determine whether to associate the feedback with the transition or the second light effect. The moment the user provides the feedback after the transition may determine the likelihood of the association of the feedback with the transition/second light effect.

In an embodiment, the feedback associated with the transition may be related to transition characteristics, wherein said characteristic may comprise duration, speed, and/or color of the transition.

The transition from the first light effect to the second light effect may be characterized by the transition characteristics. These transition characteristics may comprise duration, speed, and/or color of the transition. The machine/model may be arranged to learn these transition characteristics of the transition based on the user's feedback. This list of characteristics is not exhaustive, and other transition characteristics are not excluded.

In an embodiment, the method may further comprise determining the second set of control parameters and/or the transition based on a prior feedback.

The training of the machine may be an iterative process, e.g. the second set of control parameters and/or the transition may be based on a prior feedback. For example, if the user prefers a light effect and has indicated it via a prior feedback, the second light set of control parameters may be determined based on the prior light effect. For instance, if the user has indicated that the user prefers a high brightness level; the second set of control parameters may be determined such that the brightness level is in a high range. The training of the machine may iterate based on each feedback.

In an embodiment, the method may further comprise determining the second set of control parameters and/or the transition based on a predetermined selection criterion.

The determination of the second set of control parameters and/or the transition may be based on predetermined selection criteria. The predetermined selection criteria may be related to a contextual parameters, which may be related to environmental conditions, the user, the location and/or the time. The contextual parameters may be obtained from a (remote) memory and/or be detected by one or more sensors. Examples of selection criteria include a time of day, a date, a day of a week, a weather condition, a measure of ambient light, an occupancy measure, an activity of the user, and a control input etc.

In an embodiment, the method may further comprise determining an identity of the user; and determining the second set of control parameters and/or the transition based on the determined identity.

In a multiuser environment, i.e. when multiple users are present in the environment, it may be important to identify the user and train the machine according to the preference of the identified user. In this example, the second set of control parameters and/or the transition (characteristics) may be based on the identified user.

In an embodiment, the feedback may comprise an active feedback or a passive feedback.

The feedback of a user may comprise active or obtrusive feedback which requires a user to actively provide feedback. Alternatively, the feedback may be passive or non-obtrusive which does not require a user to actively provide feedback, but the feedback is learnt from the user's behavior.

In an embodiment, the feedback may comprise an active feedback, and the active feedback may comprise actuating at least one actuator and/or a voice input, by the user.

One of the active responses related to the second set of control parameters and/or transition may comprise actuating at least one actuator, e.g. a like or dislike button. For example, if the user actuates the like button, it is considered as a positive feedback, and if the user actuates the dislike button, it is considered as a negative feedback. Additionally, and/or alternatively, the feedback may be in the form of a voice command as well.

In an embodiment, the feedback may comprise a passive feedback, and the passive feedback may comprise feedback based on a gaze and/or a gesture of the user.

With passive feedback, the user is not expected to 'actively' perform an action, the feedback may comprise a gaze and/or a gesture of the user. In another example, an inaction of the user while being present in the environment may also be considered as a positive feedback. In an advance embodiment, an EEG of the user may be recorded, and feedback may be based on such measurements.

In an embodiment, machine learning algorithms may be used to train the machine.

Machine learning algorithms such as supervised learning and/or reinforcement learning may be used to train the machine to optimize the light effect and/or the transition.

According to a third aspect, the object is achieved by a controller for training a machine for automatizing lighting control actions; wherein the controller comprises a processor arranged for executing the steps of method according to the first and/or the second aspect.

According to a fourth aspect, the object is achieved by a lighting system for training a machine for automatizing lighting control actions comprising one or more lighting devices arranged for illuminating an environment; and a controller according to the third aspect.

According to a fifth aspect, the object is achieved by a computer program product comprising instructions which, when the program is executed by a computer, cause the computer to carry out the steps of the method of the first and/or the second aspect. It should be understood that the computer program product, the controller, and the system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
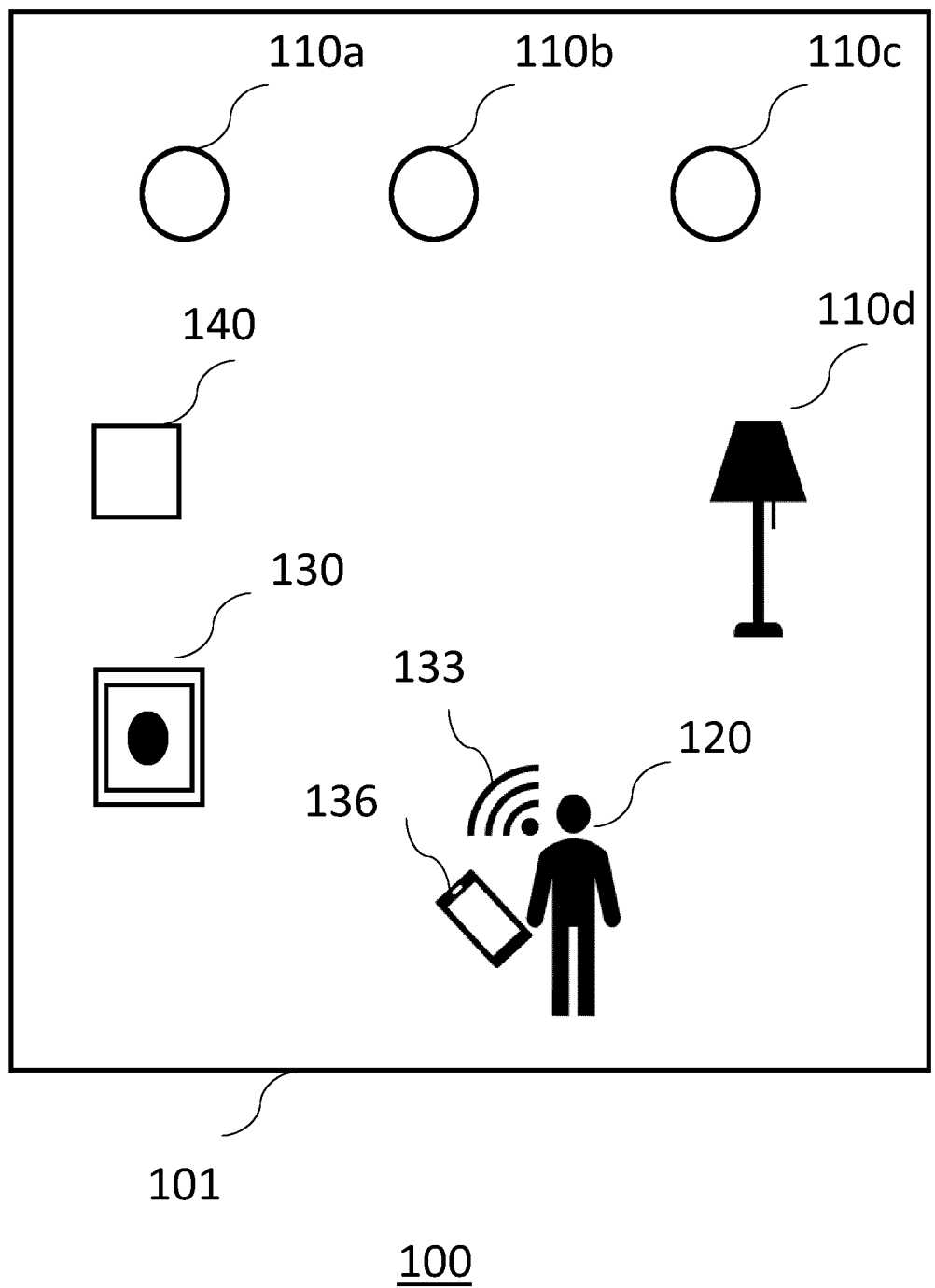
FIG. 1 shows schematically and exemplary an embodiment of a system for training a machine for automatizing lighting control actions.

FIG. 1 shows schematically and exemplary an embodiment of a system 100 with lighting device(s) 110a-d for illuminating an environment 101. The environment 101 may be an indoor or an outdoor environment, such as an office, a factory, a house, a grocery store or a hospital, a sports arena etc. The system 100 exemplary comprises four lighting devices 110a-d. The lighting devices 110a-d may be comprised in a lighting system. The lighting system may be a connected lighting system, e.g. Philips Hue, wherein the lighting devices 110a-d may be connected to an external network, e.g. Internet. A lighting device 110a-d is a device or structure arranged to emit light suitable for illuminating an environment 101, providing or substantially contributing to the illumination on a scale adequate for that purpose. A lighting device 110a-d comprises at least one light source or lamp (not shown), such as an LED-based lamp, gas-discharge lamp or filament bulb, etc., (optionally) with an associated support, casing or other such housing. Each of the lighting devices 110a-d may take any of a variety of forms, e.g. a ceiling mounted lighting device, a wall-mounted lighting device, a wall washer, or a free-standing lighting device (and the lighting devices need not necessarily all be of the same type). In this exemplary figure, the lighting devices 110a-c are ceiling mounted and the lighting device 110d is a free-standing lighting device. The system 100 may contain any number/type of the lighting devices 110a-d.

The lighting devices 110a-d may be controlled based on a first set of control parameters. The controlling of the lighting devices 110a-d may comprise controlling one or more of: color, color temperature, intensity, beam width, beam direction, illumination intensity, other parameters of one or more of the light sources (not shown) of the lighting devices 110a-d. The lighting devices 110a-d may be controlled based on a second set of control parameters. A first and a second light effect may be rendered when the lighting devices 110a-d are controlled based on the first and the second set of control parameters, respectively. The second set of control parameters may be different from the first set of control parameters such that the difference between the first light effect and the second light effect is perceivable by a user 120. In a simple example, the light effect is a brightness level of the lighting devices 110a-d, for instance, the first light effect is a 30% brightness level, and the second light effect is a 70% brightness level. The second light effect, i.e. 70% brightness level, is determined such that the difference between the first light effect and the second light effect is perceivable by a user 120. For example, the selection of 70% brightness level is based on an ambient light level in the environment 101 such that a difference of 50% in brightness levels is perceivable by a user 120. In another example, the controlling of the lighting devices 110a-d based on the first set of control parameters provides no light output.

There is a transition phase over a transitioning time period for a change from the first light effect to the second light effect. For example, the first light effect of 30% brightness level is slowly transitioned by linearly increasing the brightness level to the second light effect of 70% brightness level. In another example, the transitions may comprise an exponential change. In an extreme example, the transition time period is zero, such that the first light effect of 30% brightness, in the next moment (instantaneous), is changed to the second light effect of 70% brightness.

In an example, the light effect comprises light scenes which can be used to enhance, e.g. entertainment experiences such as audio-visual media, set an ambience and/or a mood of a user 120. For instance, for Philips Hue connected lighting system, the first light effect is an 'enchanted forest' light scene and the second light effect is Go-to-sleep light scene. The first and/or the second light effect may comprise a static light scene. The first and/or the second light effect may comprise a dynamic light scene, wherein the dynamic light scene comprises light effects which change with time. For the dynamic light scene, the first and/or the second light effect may comprise a first light state and a second light state. The first light state may comprise a first (predefined) pattern and the second light state may comprise a second (predefined) pattern. The pattern may comprise a duration, level of dynamism of the light effects etc. The first and the second set light states may be related to a first and a second subset of the second set of control parameters respectively. In such an example, the training of the machine comprises automatizing the (first and/or second) subsets of the second set of control parameters. For dynamic light effects, the transition may, e.g. comprise changing colors, dynamism, rendering an intermediate scene etc.

A feedback from a user is received during a feedback time period. The feedback may comprise an active feedback or a passive feedback. The active feedback may comprise actuating at least one actuator, e.g. like/dislike button on a user's mobile device 136 to indicate his/her preference, wall-switch 130 for instance to control the lighting devices 110*a-d* to change the second light effect to another light effect which (implicitly) indicates user preference (dislike) towards the second light effect; and/or a voice input 133, by the user. The at least one actuator may be used to control the lighting devices 110*a-d*.

The feedback may comprise a passive feedback, and wherein the passive feedback comprises feedback based on a gaze and/or a gesture of the user 120. The system 100 may comprise sensing means 140 such as presence sensor, gaze detection means, e.g. by using RF sensing etc. The methods of detecting gaze and/or gestures are well-known in the art and therefore are not further discussed here.

The feedback of the user 120 may be received during the feedback time period. The feedback time period may start after the transition has been taken place (e.g. after the transitioning time period) or partially overlaps with the transitioning time period such that the user's 120 feedback is acceptable during transition and not discarded. Based on the condition, that if the feedback has been received within or after a predetermined time period during the feedback time period; the feedback is associated to either transition or the second light effect. Alternatively, a likelihood is assigned to an association of the feedback with the transition and with the second light effect; wherein the likelihood that the feedback is associated with the transition decreases as a function of time during the feedback time period; and wherein the likelihood that the feedback is associated with the second light effect increases accordingly. For example, when the feedback time period partially overlaps with the transitioning time period and if the feedback has been received within the overlapping time period; the feedback is assigned with the transition.

A machine may be trained based on the associated feedback. Machine learning algorithms, such as supervised learning, e.g. SVM, decision forest etc. may be used to train the machine. Reinforcement learning may be used to train the machine. The learning algorithm may comprise iterative learning such that the determination of the second set of control parameters and/or the transition may be based on a prior feedback, wherein the algorithm iterative trains the machine. The training may comprise different phases, such as a feedback phase wherein in the feedback phase the feedback is received from the user 120. The length of the feedback phase may comprise the feedback time period, which is assumed to be long enough to capture sufficient information needed for training. Subsequent to the feedback phase, a training phase may be started. The training phase may be defined during which the machine is trained. In an example, two different machines may be trained each for the second light effect and for the transition. For iterative learning, the feedback phase and the training phase may be iteratively used. In an example, the feedback phase may be the first week when the lighting devices 110*a-b* have been, e.g. initially installed, commissioned and the user 120 has started using them. The duration of the feedback phase may be defined by the user 120. In an example, the training phase may comprise a learning phase and a fine-tuning phase; wherein in the learning phase, the second set of control parameters and/or the transition may be learnt based on a user feedback. In the fine-tuning phase, the second set of control parameters and/or the transition may be further optimized based on further user inputs. In an example, an identity of the user 120 is determined, for instance, by the imaging sensor. The determination of the second set of control parameters and/or transition may be based on the determined identity, e.g. based on the preference of the identified user. In an example, the second set of control parameters and/or the transition may be based on a predetermined selection criterion. The selection criteria may comprise such as a time of day, a date, a day of a week, a weather condition, a measure of ambient light, an occupancy measure, an activity of the user, and a control input etc.

Figure 2:
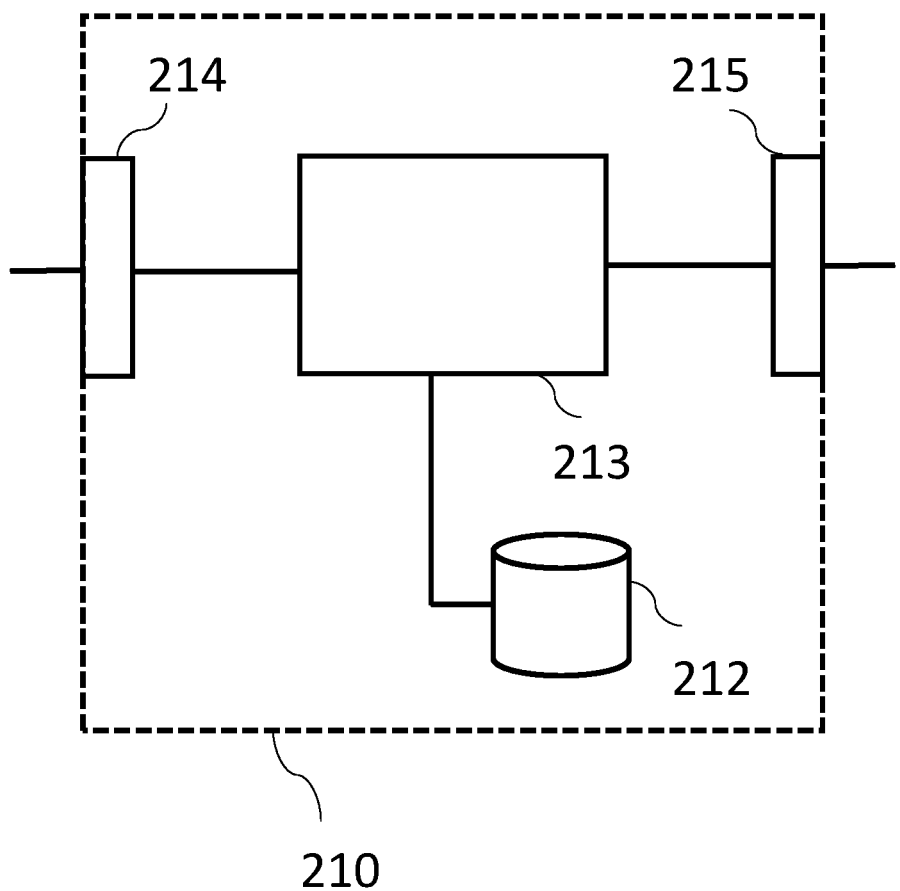
FIG. 2 shows schematically and exemplary an embodiment of a controller for training a machine for automatizing lighting control actions.

FIG. 2 shows schematically and exemplary an embodiment of a controller 210 for training a machine for automatizing lighting control actions. The controller 210 may comprise an input unit 214 and an output unit 215. The input 214 and the output 215 units may be comprised in a transceiver (not shown) arranged for receiving (input unit 214) and transmitting (output unit 215) communication signals. The communication signal may comprise control instructions to control the lighting devices 110*a-d*. The input unit 214 may be arranged for receiving communication signals from the switch 130 and/or from the voice command 133. The input unit 214 may be arranged for receiving the communication signals from the user mobile device 136. The communication signals may comprise control signals. The controller 210 may further comprise a memory 212 which may be arranged for storing communication IDs of the lighting devices 110*a-d* and/or the sensor 140 etc. The memory 212 may further be arranged for storing prior feedback. The controller 210 may comprise a processor 213 arranged for training the machine. The training of the machine may be performed external to the controller 210. The controller 210 may be used to infer preference of the user based on the trained machine. In an example, the inference may also be performed external to the controller 210, and the controller 210 may be arranged for receiving control commands based on the trained machine.

The controller 210 may be implemented in a unit separate from the lighting devices 110*a-d*/sensor 140/wall-switches 130, such as wall panel, desktop computer terminal, or even a portable terminal such as a laptop, tablet or smartphone. Alternatively, the controller 210 may be incorporated into the same unit as the sensor 140 and/or the same unit as one of the lighting devices 110*a-d*. Further, the controller 210 may be implemented in the environment 101 or remote from the environment (e.g. on a server); and the controller 210 may be implemented in a single unit or in the form of distributed functionality distributed amongst multiple separate units (e.g. a distributed server comprising multiple server units at one or more geographical sites, or a distributed control function distributed amongst the lighting devices 110a-d or amongst the lighting devices 110a-d and the sensor 140). Furthermore, the controller 210 may be implemented in the form of software stored on a memory (comprising one or more memory devices) and arranged for execution on a processor (comprising one or more processing units), or the controller 210 may be implemented in the form of dedicated hardware circuitry, or configurable or reconfigurable circuitry such as a PGA or FPGA, or any combination of these.

Regarding the various communication involved in implementing the functionality discussed above, to enable the controller 210, for example, to receive presence signal output from the presence sensor 140 and to control the light output of the lighting devices 110a-d, these may be implemented in by any suitable wired and/or wireless means, e.g. by means of a wired network such as an Ethernet network, a DMX network or the Internet; or a wireless network such as a local (short range) RF network, e.g. a Wi-Fi, ZigBee or Bluetooth network; or any combination of these and/or other means.

Figure 3:
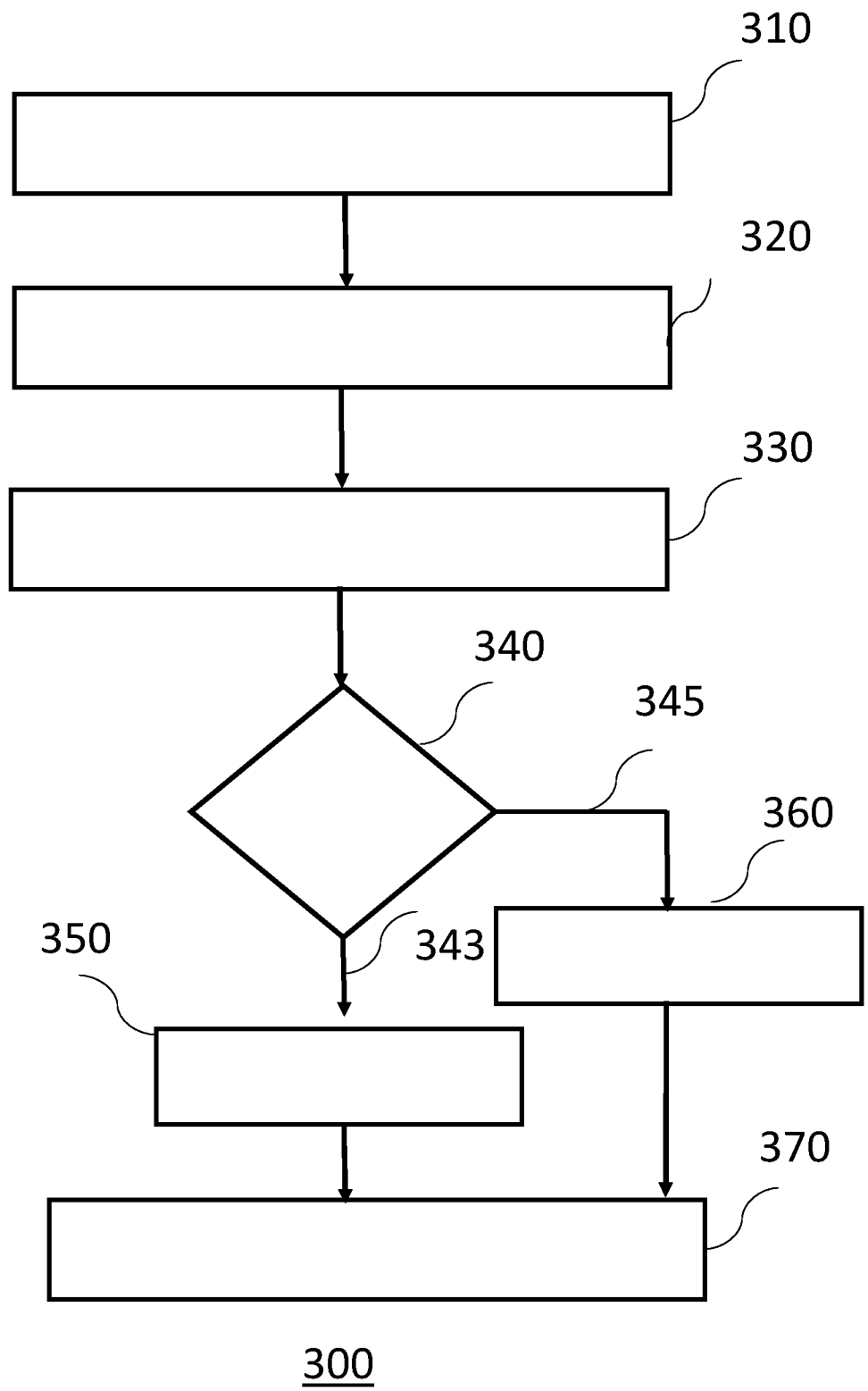
FIG. 3 shows schematically and exemplary a flowchart illustrating an embodiment of a method for training a machine for automatizing lighting control actions.

FIG. 3 shows schematically and exemplary a flowchart illustrating an embodiment of a method 300 for training a machine for automatizing lighting control actions. The method 300 may comprise controlling 310 one or more lighting devices 110a-d to render a first light effect based on a first set of control parameters. The method 300 may further comprise controlling 320 the one or more lighting devices 110a-d to render a second light effect based on a second set of control parameters by transitioning over a transitioning time period from the first light effect to the second light effect. The transition may be characterized by the transitional characteristics, such as duration, speed, color etc.

The method 300 may further comprise receiving 330 a feedback from a user during a feedback time period. The feedback may be an active feedback or a passive feedback. In an example, a signal indicative of a presence of a user may be received and then the second light effects have been rendered with the transition from the first light to the second light effect. The feedback time period may comprise sufficient time for the user to observe/perceive the transition and the second light effects and to receive feedback which is sufficient to train the model.

Figure 4:
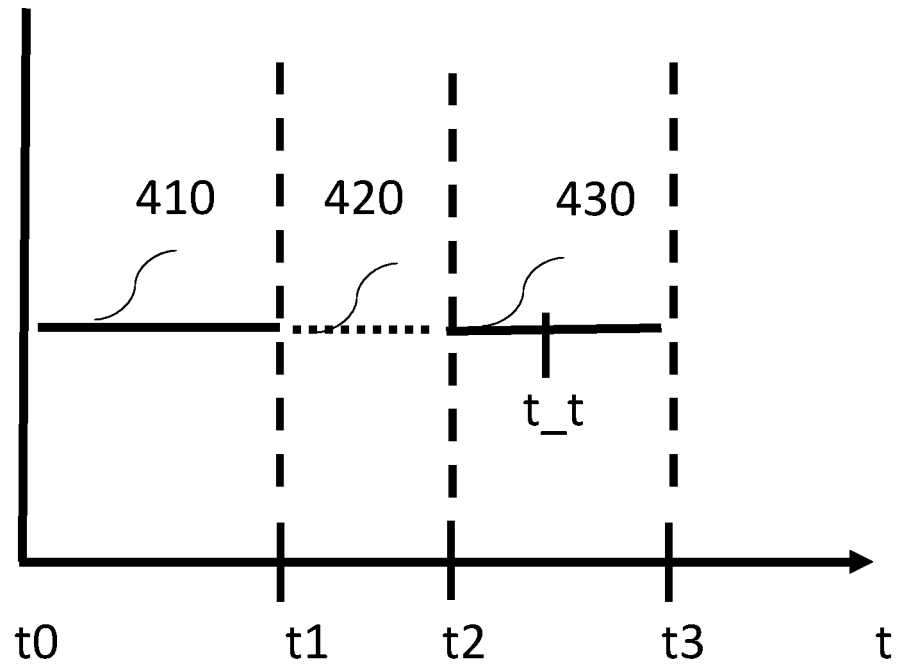
FIG. 4 shows schematically and exemplary a timing diagram for receiving and assigning feedback.

The method 300 may further comprise the condition that if the feedback has been received 330 within a predetermined time period t_t (as shown in FIG. 4) during the feedback time period (yes condition 343); the feedback is associated 350 with the transition. Now referring to FIG. 4 which shows schematically and exemplary a timing diagram for receiving and assigning feedback. On x-axis in FIG. 4, a time-axis t is shown, and the y-axis is the rendering and a change of light effects after a transition. The one or more lighting devices 110a-d are controlled 310 to render a first light effect based on a first set of control parameters during the time period t0-t1. Depending on the light effect, the time period t0-t1 may be in seconds, minute or hours (or even more). The one or more lighting devices 110a-d are controlled 320 to render a second light effect based on a second set of control parameters during the time period t2-t3 by transitioning over a transitioning time period t1-t2 from the first light effect to the second light effect. The duration of time period t2-t3 may be depending on the second light effect. The transitioning time period t1-t2 may be depending on the rendered transition. In an example, the transitioning time period t1-t2 may be a characteristic to learn based on user 120 preference. In an example, the transitioning time period t1-t2 may approach zero, such that the one or more lighting devices 110a-d are controlled 320 to instantaneously transit to the second light effect. The association of feedback to either transition or the second light effect may be based on the predetermined time period t_t. Therefore, the determination of whether the feedback is associated with the transition or with the second light effect may be based on the time instance (e.g. t_t) on which the feedback from the user 120 has been received.

Now referring back to FIG. 3. As discussed before, the method may comprise if the feedback has been received 330 within a predetermined time period t_t during the feedback time period (yes condition 343); the feedback is associated 350 with the transition. Alternatively, if the feedback has been received 330 after the predetermined time period during the feedback time period; the feedback is associated 360 with the second light effect. The predetermined time period may be determined based, e.g., on user historical data, duration of the rendering of the second light effect, duration of the transition etc. The predetermined time period may be randomly selected.

The method 300 may further comprise training 370 the machine based on the associated 350-360 feedback. Machine learning algorithms may be used to train the machine. For example, supervised learning may be used. Supervised learning is the machine learning task of learning a function or model that maps an input to an output based on an input-output data pairs. It infers a function from a labeled training data set comprising of a set of training data. In supervised learning, each sample in the training data set is a pair consisting of an input (e.g. a vector) and a desired output value. For instance, the associated 350-360 feedback is output, and the second set of control parameters and/or the transition is the input vector. The training data set comprises the output (feedback) and the input (the second set of control parameters/transition). A supervised learning algorithm, such as Support Vector Machine (SVM), decision tree (random forest) etc., analyzes the training data set and produces an inferred function or model, which can be used for making predictions based on a new data set. In this example, a binary classifier machine may be trained, which may predict the user 120 preference for a new set of control parameters and/or for the transition. One model may be trained for both the second set of control parameters and training; or two separate models may be trained for each of the second set of control parameters and for the transitions, respectively. If the model predicts a positive user preference for the new set of control parameters, the lighting devices 110a-d may be controlled to render a new light effect based on the new set of control parameters. Alternative to supervised learning, reinforcement learning may be used to train the machine. Other learning algorithms such as rule-based learning, probabilistic reasoning, fuzzy logic to train a machine for automatizing lighting control action known in the art may also be considered.

In a different example, if the determination cannot made whether the feedback is related to the transition or the second light setting, the user may be requested to clarify this (e.g. via a voice assistant, via a display of a mobile device 136, etc.).

Figure 5:
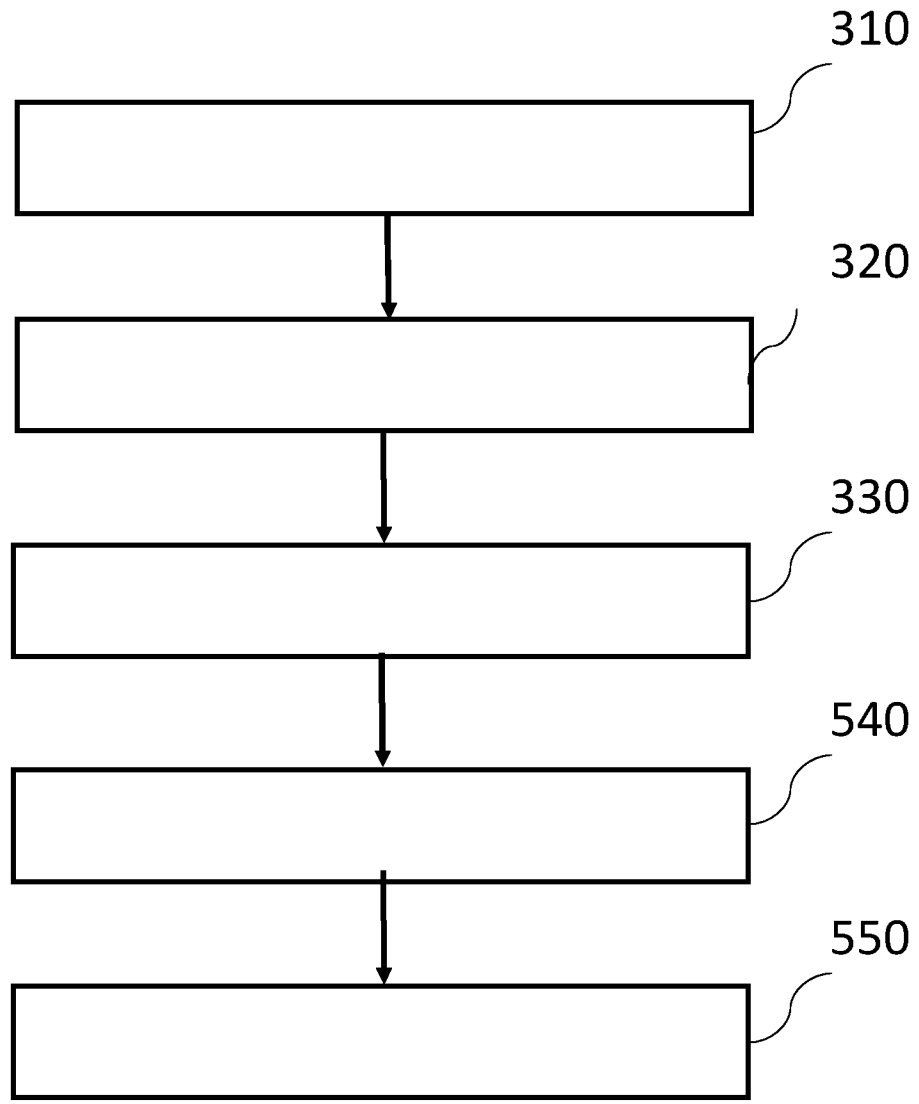
FIG. 5 shows schematically and exemplary a flowchart illustrating an embodiment of another method for training a machine for automatizing lighting control actions.
Figure 6:
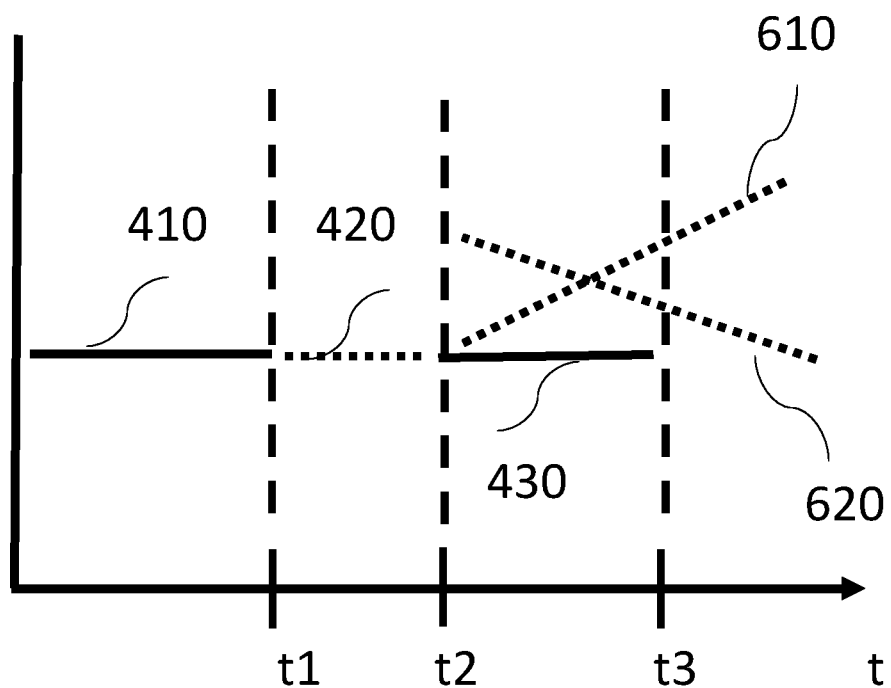
FIG. 6 shows schematically and exemplary another timing diagram for receiving and assigning feedback.

FIG. 5 shows schematically and exemplary a flowchart illustrating an embodiment of another method 500 for training a machine for automatizing lighting control actions. The method steps of controlling 310-320 and receiving 330 the feedback from the user 120 are the same as mentioned in the method 300 of FIG. 3. The method 500 may further comprise assigning 540 a likelihood to an association of the feedback with the transition and with the second light effect;

wherein the likelihood that the feedback is associated 540 with the transition decreases as a function of time during the feedback time period; and wherein the likelihood that the feedback is associated 540 with the second light effect increases accordingly. The likelihood of the feedback may comprise a probability value which may be assigned 540 with transition and with the second light effect. For example, as the sum of the probability is 1, the transition may be assigned 540 a probability of 0.7 and the second light effect a probability of 0.3 depending on at what time instance the feedback has been received. Now referring to FIG. 6 which shows schematically and exemplary a timing diagram for receiving and assigning feedback. The xy-axes and the time periods t0-t1 (the first light effect), t1-t2 (transitioning time period) and t2-t3 (the second light effect) are the same as shown in FIG. 4. The increase/decrease of likelihood is shown exemplary by dotted lines 610 and 620. The likelihood that the user feedback is related to the transition, in this exemplary figure, decreases 620 linearly as a time goes on. Similarly, the likelihood that the user feedback is related to the second light effect, in this exemplary figure, increases 610 linearly as a time goes on. In another example, the likelihood of feedback for transition/second light effect may increase/decrease exponentially or with a different function. In an example, the increase and decrease may comprise different function of time, e.g. increasing linearly and decreasing exponentially. At one point in time, the likelihood may be the same (50%-50%) for both the transition and the second light effect.

Now referring back to FIG. 5. The method 500 may further comprise training 550 the machine based on the likelihood of the associated feedback. The training 550 considers the likelihood during the training process. The algorithms as pointed out before, e.g. supervised learning, reinforcement learning etc. may be used with a difference that each feedback may not be giving equal weights but are adjusted based on the likelihood. These likelihood values may be used for each model for each transition and the second light effect separately or it is used as a relative likelihood in the training 550.

The method 300-500 may be executed by computer program code of a computer program product when the computer program product is run on a processing unit of a computing device, such as the controller 210.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method for training a machine for automatizing lighting control actions, wherein the method comprises the steps of:
   controlling one or more lighting devices to render a first light effect based on a first set of control parameters;
   controlling the one or more lighting devices to render a second light effect based on a second set of control parameters by transitioning over a transitioning time period from the first light effect to the second light effect;
   receiving a feedback from a user during a feedback time period; characterized in that
   wherein if the feedback has been received within a predetermined time period during the feedback time period;
   associating the feedback with the transition; and
   wherein if the feedback has been received after the predetermined time period during the feedback time period;
   associating the feedback with the second light effect; and
   wherein the method further comprises:
   training the machine based on the associated feedback; wherein the transition is characterized by transition characteristics, and wherein the machine training comprises determining the second set of control parameters and/or the transition characteristics.

2. A method for training a machine for automatizing lighting control actions, wherein the method comprises the steps of:
   controlling one or more lighting devices to render a first light effect based on a first set of control parameters;
   controlling the one or more lighting devices to render a second light effect based on a second set of control parameters by transitioning over a transitioning time period from the first light effect to the second light effect;
   receiving a feedback from a user during a feedback time period; characterized in that
   assigning a likelihood to an association of the feedback with the transition and with the second light effect; wherein the likelihood that the feedback is associated with the transition decreases as a function of time during the feedback time period; and wherein the likelihood that the feedback is associated with the second light effect increases accordingly; and
   training the machine based on the likelihood of the associated feedback; wherein the transition is characterized by transition characteristics, and wherein the machine training comprises determining the second set of control parameters and/or the transition characteristics.

3. The method according to claim 1, wherein the feedback time period partially overlaps with the transitioning time period, and wherein the method further comprises: if the feedback has been received within the overlapping time period;
associating the feedback with the transition.

4. The method according to claim 1, wherein the feedback time period starts after the transitioning time period.

5. The method according to claim 1, wherein the feedback associated with the transition is related to transition characteristics, wherein said characteristic comprises duration, speed, and/or color of the transition.

6. The method according to claim 1, wherein the method further comprises:
determining the second set of control parameters and/or the transition based on a prior feedback.

7. The method according to claim 1, wherein the method further comprises:
determining the second set of control parameters and/or the transition based on a predetermined selection criterion.

8. The method according to claim 1, wherein the method further comprises:
determining an identity of the user; and
determining the second set of control parameters and/or the transition based on the determined identity.

9. The method according to claim 1, wherein the feedback comprises an active feedback or a passive feedback.

10. The method according to claim 1, wherein the feedback comprises an active feedback, and wherein the active feedback comprises actuating at least one actuator and/or a voice input, by the user.

11. The method according to claim 1, wherein the feedback comprises a passive feedback, and wherein the passive feedback comprises feedback based on a gaze and/or a gesture of the user.

12. The method according to claim 1, wherein machine learning algorithms are used to train the machine.

13. A controller for training a machine for automatizing lighting control actions; wherein the controller comprises a processor arranged for executing the steps of method according to claims 1.

14. A lighting system for training a machine for automatizing lighting control actions comprising
one or more lighting devices arranged for illuminating an environment;
a controller according to claim 13.

15. A computer program product comprising instructions which, when the program is executed by a computer, cause the computer to carry out the steps of the method of claim 1.

* * * * *